INVENTOR
JOSEPH W. SPRADLING
BY
ATTORNEY

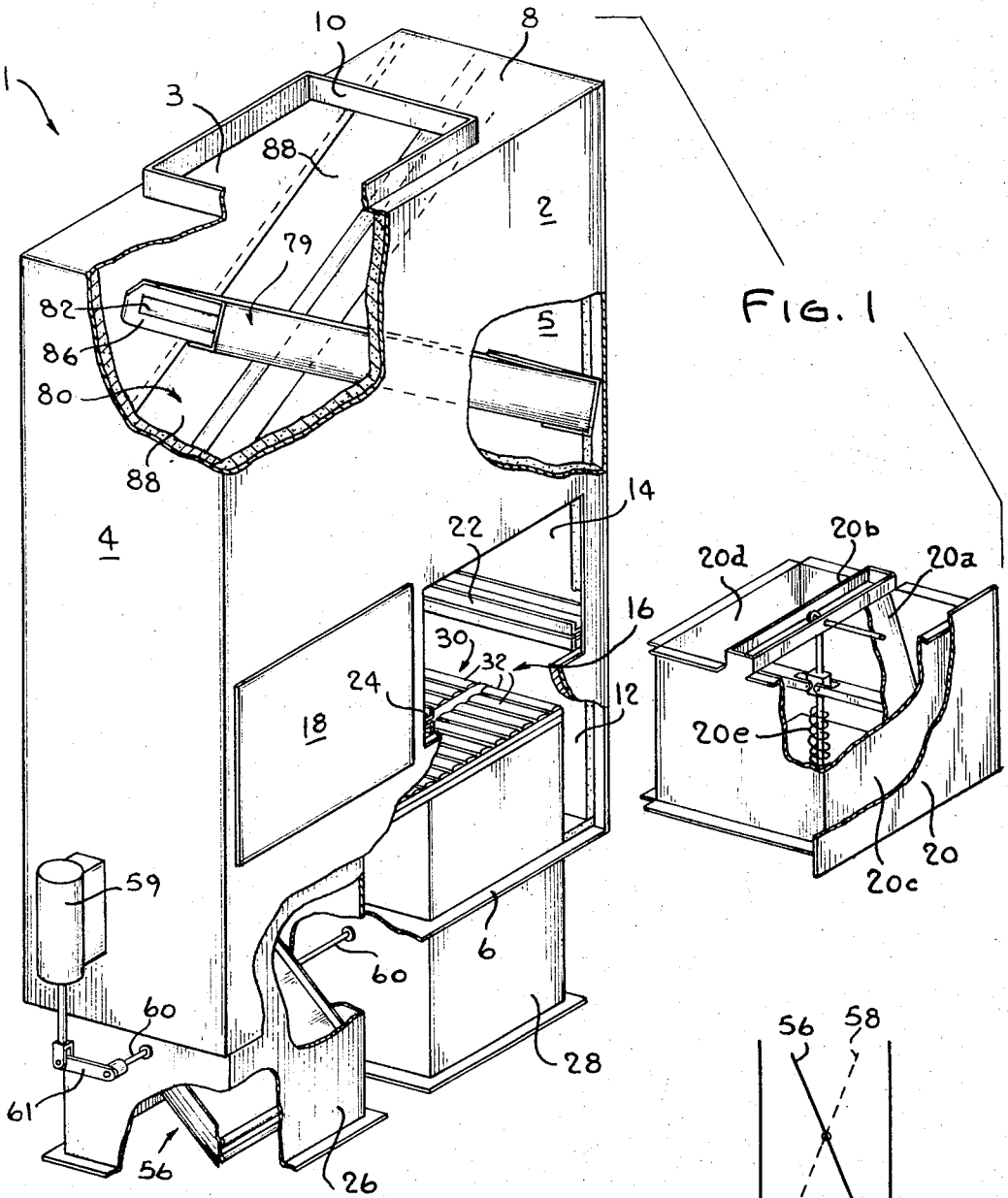
FIG. 1
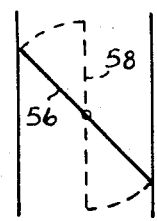
FIG. 9
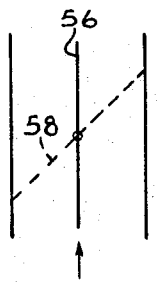
FIG. 11
FIG. 10
INVENTOR
JOSEPH W. SPRADLING
BY
ATTORNEY

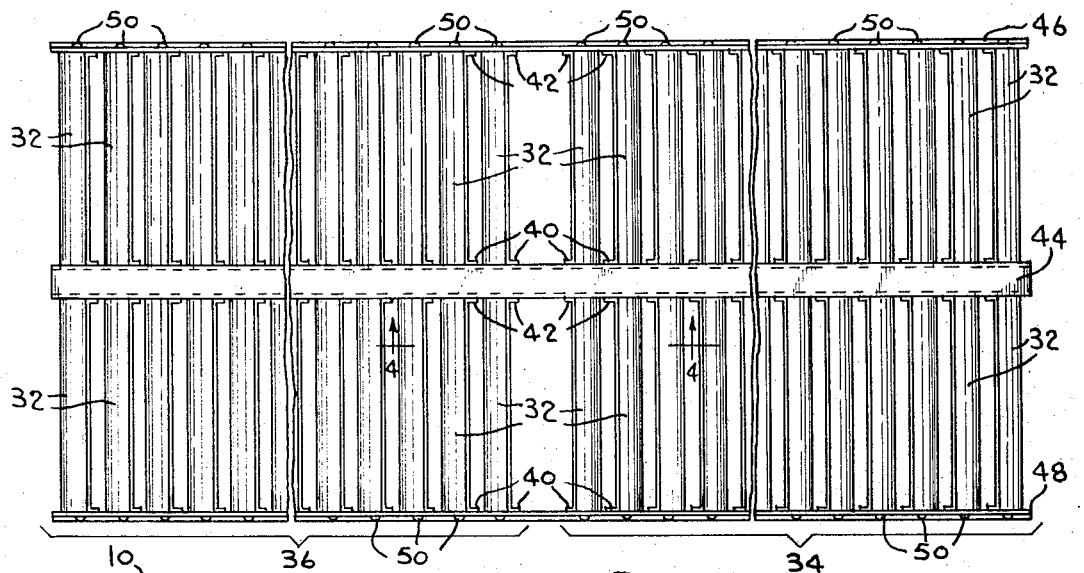
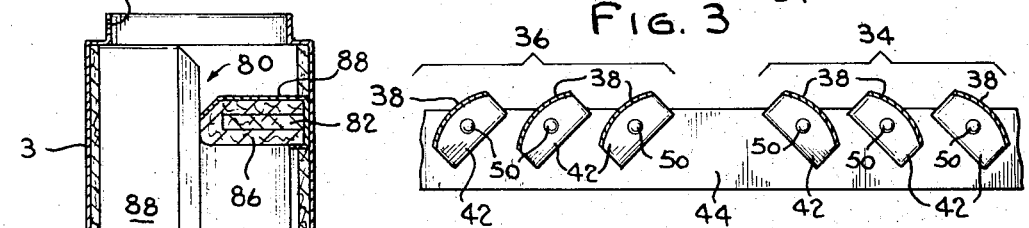
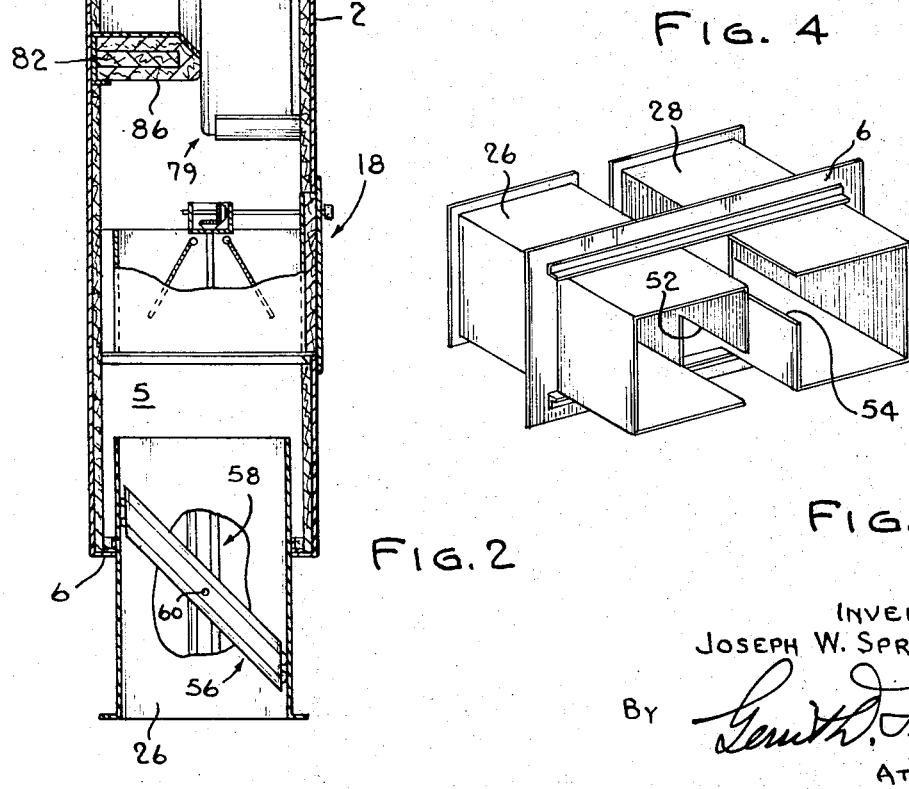
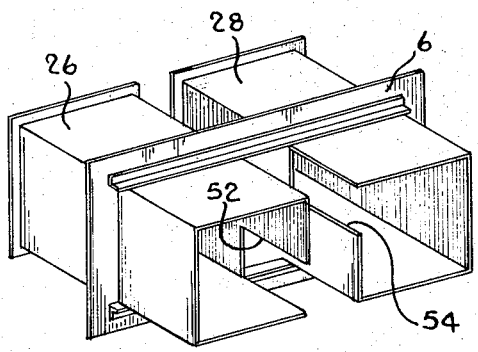
INVENTOR
JOSEPH W. SPRADLING
BY
ATTORNEY Jan. 16, 1968         J. W. SPRADLING         3,363,534
AIR DISTRIBUTING DEVICE
Filed Jan. 8, 1965                3 Sheets-Sheet 3

United States Patent Office 3,363,534
Patented Jan. 16, 1968

3,363,534
AIR DISTRIBUTING DEVICE
Joseph W. Spradling, Madison, Wis., assignor, by mesne assignments, to Wehr Corporation, Milwaukee, Wis., a corporation of Wisconsin
Filed Jan. 8, 1965, Ser. No. 424,320
18 Claims. (Cl. 98—38)

This invention relates to air distributing systems and, more particularly, to control units adapted for use in such systems and capable of delivering a constant volume of air at a desired temperature by mixing supplies of relatively hot and cold air prior to delivery.

Units of the type to which this invention relates are described and claimed in the co-pending application of Joseph W. Spradling and Gordon C. Sylvester, Ser. No. 292,558, filed July 3, 1963, entitled, "Air Distributing Device," and assigned to the assignee of this application, now Patent No. 3,250,203. The distributing unit of this application constitutes an improvement over the designs which are the subject of that co-pending application in that they have a greater capacity and are capable of handling larger volumes of air.

Accordingly, a general object of this invention is to increase the capacity of control units of this type, and to do so without sacrificing any of the operating efficiency of such units and while maintaining a relatively simple structure.

Air flow control units of this type generally include some form of constant volume regulator which is effective to maintain delivery of a constant volume of air. To permit the control units to properly handle an increased air capacity, this invention also proposes to increase the capacity of the constant volume regulator. In the preferred embodiment disclosed herein two constant volume regulators are used as compared to only one such regulator in the units of the above identified co-pending application but in the development of these higher capacity units it was observed that merely increasing the number of volume control regulators does not in and of itself provide a satisfactory unit. It was discovered that since units of this type receive air from two separate supplies (hot and cold) there is a tendency for a somewhat laminar-type of flow to occur through the units and through the constant volume regulators which could result in a laminar-type of discharge from the unit with the discharge air containing portions at perceptively different temperatures. Moreover, the delivery of air from two separate supplies and laminar-type flow through the units could also adversely affect the relative operating characteristics between the volume control regulators. As a solution to these problems of possible laminar discharge and to maintain relatively uniform operating characteristics between the volume regulators, this invention further proposes an arrangement whereby air is diverted from one inlet stream into the other to achieve a thorough mixing of the air prior to its delivery to and passage through the constant volume regulators. This diversion of air achieves a relatively uniform pressure on the inlet side of the constant volume regulators thereby equalizing the pressure at the regulators to insure uniform characteristics between regulators and also mixes the air to provide a relatively uniform temperature. Accordingly, a further, more specific, object of this invention is to achieve adequate mixing of the air prior to discharge of the air from the unit; and, furthermore, to equalize the pressure on the inlet side of the constant volume regulators.

In units of this type the relative volumes of the hot and cold air admitted to the units are generally regulated by thermostatically controlled proportioning valves associated with the air inlets. One valve controls a hot air inlet while another valve controls a cold air inlet and the valves are coupled for joint movement so that, for example, a call for cooler discharge air will result in the cold air inlet being opened a required amount while the hot air inlet is closed a corresponding amount. This maintains a relatively uniform delivery of air from a volume standpoint but achieves that volume with the particular amounts of hot and cold air required to achieve a given temperature. Handling larger capacities of air presents two additional problems. First, with the relatively larger quantities of air being handled the system forces exerted on the proportioning valves can become quite large to thereby require inordinately large valve operating mechanisms which could negate any advantages to be gained from handling larger capacities with a single control unit and, secondly, with the larger capacities being handled leakage past the valves becomes a critical factor since such leakage can destroy the intended balance between the proportioning valves.

Further, more specific objects of this invention are to minimize the system forces within the air distributing system and thereby permit the use of relatively small valve operating mechanisms; and, also, to minimize the leakage past the proportioning valves either in their full closed position or in any of their various modulated positions between full open and full closed. To these ends, this invention proposes the use of balanced valves to control flow through the inlets, the valves being pressure balanced within their respective inlets and being volume coordinated between inlets, i.e. the valve and inlet configurations are such that the valve movement achieves variations in the hot and cold inlets which are equal but vary in an inverse relationship so that when one valve is closed a prescribed amount the other valve is opened an equal amount. In the preferred construction the valves and their cooperating inlet ducts are rectangular in cross section to achieve optimum volume coordination between valves. With this configuration one pair of opposite sides of each valve moves parallel to an adjacent pair of opposed duct walls and sealing means is provided between these valve sides and the duct walls which wipe along and maintain continuous sealing engagement with the duct walls to prevent leakage past the valve. Accordingly, another object of this invention is to provide a control unit of this type which provides linear air delivery characteristics past the proportioning valve.

A further object of this invention is to provide an improved valve construction.

Other objects and advantages will be pointed out in, or be apparent from, the specification and claims, as will obvious modifications of the embodiment shown in the drawings, in which:

FIG. 1 is a perspective view of a controller unit constructed in accordance with this invention;

FIG. 2 is a sectional view taken generally along line 2—2 of FIG. 1 and with portions broken away;

FIG. 3 is a plan view of the air deflecting device;

FIG. 4 is an enlarged sectional view taken generally along line 4—4 in FIG. 3;

FIG. 5 is a perspective view of the air inlet ducts;

FIGS. 9–11 are generally schematic illustrations of the inlet valves in three possible positions.

Figure 6:
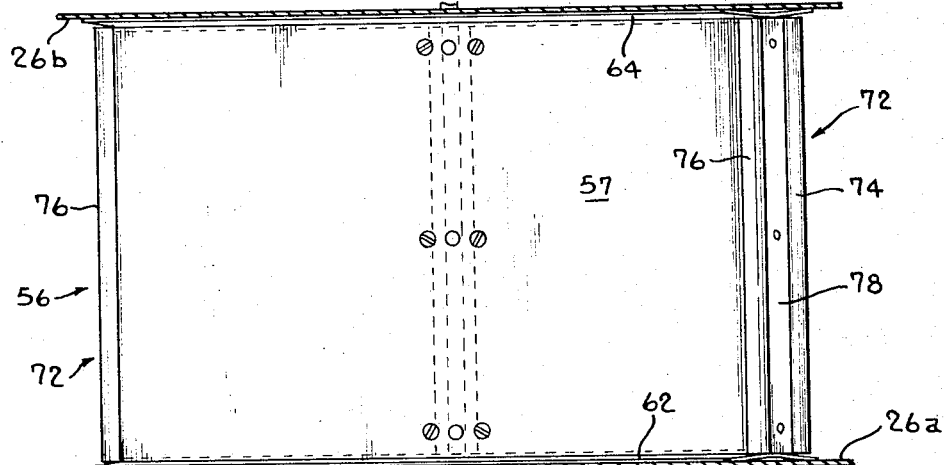
FIG. 6 is a plan view of one of the inlet valves.

With particular reference to the drawings, air distributing device 1 includes a housing formed by side walls 2 and 3, end walls 4 and 5, bottom wall 6 and top wall 8 provided with outlet opening 10. The interior of air distributing device 1 is separated into compartments 12 and 14 by interiorly located partition means 16. The partition means comprises support member 22 attached to end wall 5, support member 24 attached to and extending between front and rear walls 2 and 3 and a third support member (not shown) attached to end wall 4. The support members are relatively spaced apart to define restricted openings between compartments 12 and 14 and constant volume regulating mechanisms 18 and 20 are received between the relatively spaced support members to complete the partition means. The constant volume regulators are of the type described and claimed in the above identified co-pending application and, since the precise details of the constant volume regulators form no part of this invention, they will not be specifically described in this application with reliance being placed on the copending application for a complete description of the constant volume regulators. Briefly and with reference to regulator 20 of FIG. 1, two valve (only one illustrated) members 20a extend from bracket 20b for engagement with opposed duct walls 20c and 20d. The valve members are biased to a full open position by spring 20e and open into the path of air flow so that they pivot to a closed position about bracket 20b in response to the air flow. The valve members are illustrated in a full closed position for convenience.

Inlet ducts 26 and 28 extend through bottom wall 6 and open into compartment 12. One of the inlet ducts 26, for example, is adapted for connection to a cold air supply whereas inlet duct 28 would be connected to a hot air supply and the air from these two different sources is delivered to chamber 12. From chamber 12 the air flows through the constant volume regulators into compartment 14 and is discharged through outlet 10. With this arrangement and since a pressure drop will occur across the constant volume regulator compartment 12 can be considered a high pressure compartment and compartment 14 can be considered a low pressure compartment.

Since air is supplied from two different sources and at different temperatures the possibility exists of a laminar-type flow occurring through the two constant volume regulators which could result in discharge of air through outlet 10 having portions of perceptively different temperatures. As a solution to this problem air deflector assembly 30 is suitably supported on the inner ends of inlet ducts 26 and 28 and is effective to mix the inlet air streams in compartment 12 prior to being directed through the volume regulators. More particularly and with reference to FIGS. 1 and 3, the air deflector assembly is made up of a plurality of blades 32 which are arranged in two groups 34 and 36. Structurally, each deflector includes a base portion 38 and turned end portions 40 and 42 which are connected to central channel member 44 and respective ones of outer side members 46 and 48 by rivets 50. Side members 46 and 48 are also suitably configured (not shown) to engage the inlet ducts in assembling the air deflector on the ducts. Blades 32 of group 34 are positioned with their base portion 38 disposed at a desired angle to the flow through the inlet ducts and blades 32 of group 36 are arranged at the same angle to the flow through their respective ducts but are oppositely angled with respect to the blades of group 34 so that the blades of each group are angled toward each other. When the air deflector assembly is positioned on the air inlets, the blades of group 34 are disposed in the path of air flow through inlet 28 and the blades of group 36 are positioned in the path of air flow through inlet 26 and each group of blades diverts the flow of air from its inlet into the flow of air through the other inlet to thereby achieve a mixing of the air streams in compartment 12.

For most installations air deflector assembly 30 provides adequate mixing of the air, however, if additional mixing is desired it is preferred that the inlet ducts be notched out to permit additional intermingling of the two air flow streams. More particularly and with reference to FIG. 5, the opposed, inner faces of inlet ducts 26 and 28 are provided with notches 52 and 54 with the notches preferably offset one from the other as illustrated to thereby permit a portion of the air passing through the inlet ducts to flow into the area between the ducts where the two air streams mix and pass into chamber 12 through the central portion of the deflector assembly.

This thorough mixing of the air in chamber 12 insures equalization of the pressure in the chamber at both of the constant volume regulators and also contributes to the delivery of air having a uniform temperature. The equalized pressure insures uniform flow characteristics through both of the constant volume regulators regardless of variations which may occur in the delivery pressures of either the hot or cold air supplies. Still an additional advantage of this equalization of the pressure on the volume regulators is that, although it has general application to units of this type regardless of the inlet arrangement, it permits the use of the particular inlet arrangement illustrated without aggravating laminar flow through the unit. That is straight sections of inlet ducts can be used and can extend through the bottom wall in general alignment with the volume regulators to provide a particularly compact construction and permit the use of a relatively simplified control arrangement as will be discussed more completely hereinafter.

In units of this type the desired air temperature is achieved by mixing the prescribed amounts of hot and cold air. The amounts of hot and cold air being delivered are controlled by suitable valve arrangements associated with the hot and cold air inlets. Because of the larger volumes of air being handled the system forces could be such as to require an inordinately large valve operating mechanism which would detract from and possibly negate any advantages to be gained from providing a single unit to handle a greater air capacity unit. This invention contemplates solving this problem by using balanced valves which minimize and maintain the system forces within workable limits so as not to require an unduly large valve operating mechanism. More particularly, valve 56 is positioned within inlet duct 26 and valve 58 (see FIG. 2) is positioned within inlet duct 28. With the inlets being adjacent and extending parallel to each other the valves are most advantageously arranged for control by a common operating mechanism. As illustrated, both valves are supported for pivotal movement in their respective inlet ducts about a common axis defined by shafts 60 which extends between the ducts. Shaft 60 engages and supports each of the valves along a generally centrally located axis so that the valves assume a balanced condition in their respective inlet ducts. The shaft is connected to a suitable pneumatic motor 59 by linkage 61 for joint movement therewith and motor 59 is controlled by a suitable thermostatic arrangement (not shown).

Figure 7:
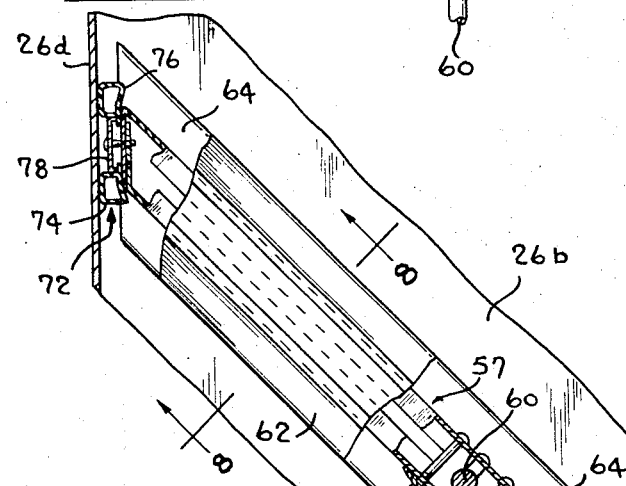
FIG. 7 is a side elevation partially in section of one of the inlet valves in its closed position.
Figure 8:
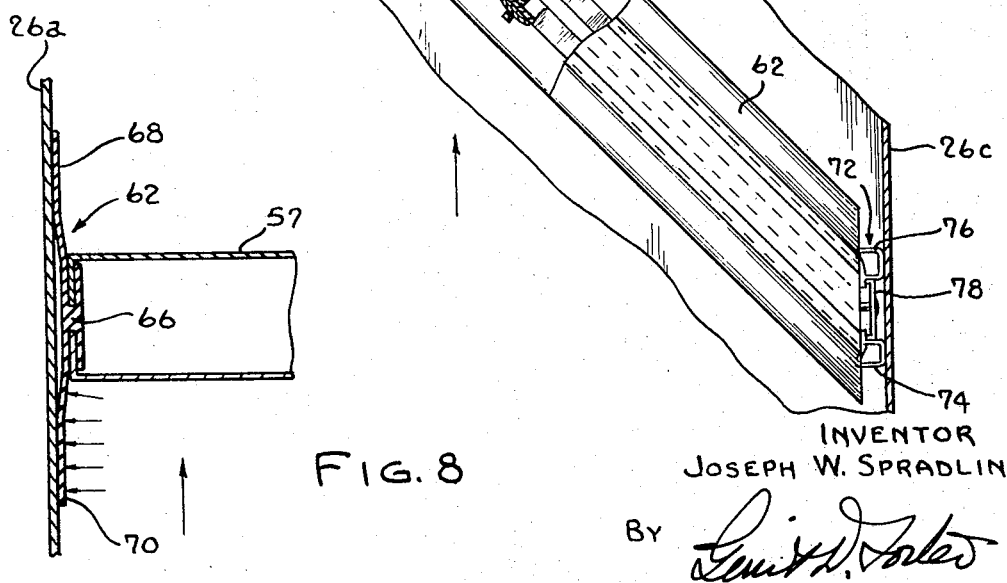
FIG. 8 is a partial sectional view taken generally along line 8—8 of FIG. 7.

Structurally both valves are identical and, therefore, only one valve has been illustrated in detail and will be described. With reference to FIGS. 6–8, valve 56 includes a generally rectangular body 57 which carries sealing gaskets 62 and 64 along one pair of opposite sides thereof, which sides move parallel to inlet duct walls 26a and 26b as the valve pivots about the axis formed by shaft 60. As can be seen more specifically in FIG. 8, each of the sealing gaskets, only gasket 62 being illustrated as both are identical, includes a central web portion 66 which is attached to the sides of valve body 57 and portions 68 and 70 which diverge from web 66 toward and engage duct wall 26a. The sealing gaskets wipe along and continuously engage their respective duct walls 26a and 26b as the valve is modulated between its full open and full closed positions. The flexible portions 68 and 70 insure a positive seal against leakage either in the full closed position, or in any of modulated open positions, since any pressure around the edges of the valve tending to cause leakage merely results in pressing the sealing gasket into more intimate engagement with the duct walls to create a more positive seal. This increased sealing effect is illustrated diagrammatically in FIG. 8 by the arrows acting on leg 70, which is on the inlet or high pressure side of the valve as indicated by the vertical arrow in FIG. 8 illustrating the direction of air flow.

The other pair of opposite sides of valve 56 move toward and away from duct walls 24c and 24d during pivotal movement of the valve and in order to insure a positive seal-off at these walls when the valve is closed sealing gasket arrangements 72 are provided. These sealing arrangements each include two hollow, elongated gaskets 74 and 76 attached to the valve by bracket 78. Gaskets 74 and 76 preferably protrude beyond the valve body (see FIG. 8) and present areas of flexible material to the air stream which then presses the gasket (gasket 74 in this distance) against the duct wall to enhance the seal against leakage.

Valves 56 and 58 are arranged on shaft 60 at an angle to each other so that when one is in its full closed position the other is in its full open position, i.e. see FIG. 2 where valve 56 is shown fully closed and valve 58 assumes a fully open position. This relative position of the valves is also illustrated schematically in FIG. 9 with other relative valve positions being illustrated schematically in FIGS. 10 and 11. Motor 59 and linkage 61 are operative to rotate shaft 60, and correspondingly valves 56 and 58 in a clockwise direction from the position illustrated in FIGS. 2 and 9. This movement moves valve 56 to open its inlet duct while valve 58 moves an equal distance to close its inlet duct a corresponding amount and thereby maintain a uniform volume of air delivered to chamber 12 but made up of different proportions of hot and cold air. In a manner well known in the art motor 59 is controlled by a suitable thermostatic control arrangement (not shown). FIG. 10 illustrates both valves at the midpoint of their travel between full open and full closed. Continued clockwise movement eventually moves valve 58 to its full closed position with valve 56 having assumed its full open position.

It will be appreciated that valve configurations other than that illustrated could be used, e.g. circular and with ducts which have a complementary configuration, but the illustrated rectangular configuration is preferred since it provides precise volume coordination between the two inlet openings, i.e. as one valve is moved to either increase or decrease the opening of its inlet, the other valve is moved a corresponding distance to open or close an exactly corresponding area in the other inlet. This is of particular significance when handling larger capacities of air since even a minor variation in flow between valves can result in a relatively large variation in the volume of air delivered through one or the other of the inlets. Moreover, the rectangular configuration permits the use of an effective sealing arrangement.

With the preferred arrangement just discussed leakage past the valve is kept to a minimum, e.g. with pressures as high as 8 inches of water and a nominal capacity (c.f.m.) based on a velocity of 3000 f.p.m. through the inlets leakage is less than 2% of the nominal capacity. This relatively small leakage is achieved by the effective seal provided at the balanced valves. The disclosed arrangement also provides a linear performance curve of c.f.m. vs. valve position. More specifically, with the static pressure of the air supplied to the inlets being held relatively constant, it has been observed that the total c.f.m. past the valves does not vary more than ±5% for any of the relative valve positions between and including the limits of closed/open and open/closed. This linear performance obtains from balanced valve condition, the effective seal at the valves and from the rectangular valve and duct shape. In order to further enhance the linear performance characteristics of the valves the angle of valve travel of between full open and closed is preferably limited to 45°, i.e. each valve moves through an arc of 45° in traveling from its full open position wherein it is parallel to the direction of air flow through the inlet to its full closed position where it is disposed transversely of that air flow to engage the duct walls and close the respective duct to air flow. This limitation of valve movement is achieved by proper provision of the necessary relationship between valve length transverse to the pivotal axis and the corresponding cross sectional dimension of the inlet duct and also by limiting the motor stroke.

To insure adequate mixing of the air before discharge through outlet 10, a baffle arrangement is provided in compartment 14 and takes the form of crossed baffle assemblies 79 and 80 extending between walls 4 and 5 and arranged at an angle with respect to each other. The baffles serve to interrupt the flow of air prior to exhaust through outlet 10 and also provide some sound attenuation characteristics. To further enhance the sound attenuation each baffle assembly has an acoustical construction. As illustrated in connection with baffle assembly 79, each contains core 82 of acoustical absorbing material such as fibrous glass and outer covering 86 of the same acoustical material. Sheet metal cover 88 extends around two sides of the deflector and, as illustrated in FIG. 1, extends over the upstream side of the baffle assembly. The sheet metal is relatively impervious to sound energy, as compared to the fibrous material, and acts as a reflector for the sound energy causing the sound waves to pass repeatedly through the fibrous material. Thus the sheet metal provides attenuation loss to the sound energy and also provides a means of readily attaching the baffle assemblies to the walls of the control unit housing.

Although but one embodiment of the present invention has been illustrated and described, it will be apparent to those skilled in the art that various changes and modifications may be made therein without departing from the spirit of the invention or from the scope of the appended claims.

What I claim is:

1. Apparatus of the type described comprising, in combination,
   means defining an enclosure having a wall portion,
   first and second hollow duct means extending through said wall portion and opening into and forming inlet openings into said enclosure,
   means defining an outlet opening in said enclosure spaced from said inlet openings,
   first and second constant volume regulating means supported in said enclosure interior between said inlet and output openings and operative to maintain a constant volume flow of air from said inlet openings to said outlet opening,
   said inlet openings arranged to direct flow therefrom in a generally common parallel direction toward said constant volume regulating means,
   valve means disposed in each of said duct means,
   means supporting said valve means in said duct means at a different angle with respect to the air flow through said duct means so that one of said valve means is arranged to assume a first position parallel to the direction of flow through and opening its duct means when the other valve means assumes a second position extending generally transversely of said direction of flow and substantially closing its respective duct means,
   means for simultaneously moving said valve means so that one valve means is moved toward its first position as the other valve means is moved toward its second position,
   and means supported in said enclosure in the path of flow from said first and second ducts to said constant volume regulating means and arranged to direct at least a portion of the air flow through each duct into the air flow through the other duct to achieve a mixing of said air flow prior to passage through said constant volume regulating means.

2. Apparatus of the type described comprising, in combination, means defining an enclosure, partition means separating the interior of said enclosure into first and second chambers and including first and second constant volume regulating means defining restricted openings between said first and second chambers and operative to maintain a constant volume flow of air from said first chamber into said second chamber, means defining an outlet opening in said second chamber, hollow, generally rectangular in transverse cross section duct means connected to said enclosure and extending and terminating adjacent each other in said first chamber to define inlets to said first chamber, said inlets directing flow therefrom in a generally common direction toward said constant volume regulating means, generally rectangular valve means disposed in the path of flow through each of said duct means, means supporting said valve means in said duct members for pivotal movement about a generally centrally located axis and with the valve means in one of said duct means arranged at an angle to the valve means in the other duct means, said angle being such that when one of said valve means assumes a position parallel to the direction of flow of air through one of said duct means the other valve means assumes a position generally transversely of the direction of flow through its duct means substantially closing its duct means to flow, a plurality of blades, and means supporting said blades in the path of flow from each of said duct means to said constant volume regulating means with the blades associated with one duct means oppositely angled with respect to the blades associated with the other duct means and the blades at each duct means arranged to direct air flow through one inlet duct means into the air flow through the other inlet duct means to achieve a mixing of said air flows prior to passage through said constant volume regulating means.

3. The apparatus of claim 2 wherein duct means in said enclosure extend adjacent each other and wherein each of said duct means includes means defining a notch in a portion of each of said duct means facing toward the other duct means.

4. The apparatus of claim 2 wherein one pair of opposite sides of said first and second valve means terminate in spaced relationship from one pair of opposed duct walls, and including sealing means attached to said one pair of opposite valve means sides having a flexible portion extending between each of said one pair of valve means sides and one of each of said one pair of opposed duct walls and is disposed on the inlet side of said first and second valve means, and sealing means arranged to extend between the other pair of opposite valve means sides and the other pair of opposed duct walls when said valve means are closed in said duct means.

5. The apparatus of claim 2 wherein one pair of opposite sides of each of said valve means is generally parallel to one pair of opposed duct walls of said duct means and including generally U-shaped sealing means having the webs thereof attached to said one pair of opposite valve means sides and the legs thereof diverging angularly from said valve means toward and engaging the duct walls of said one pair of opposed duct walls.

6. Apparatus of the type described comprising, in combination, means defining an enclosure, means defining first and second inlet openings into the interior of said closure, means defining an outlet opening from said enclosure interior spaced from said inlet openings, partition means supported within said enclosure interior intermediate said inlet and outlet openings and including first and second constant volume regulating means defining restricted passages between said inlet and outlet openings and operative to maintain a stant volume flow from said inlet openings to said outlet opening, and deflector means in said enclosure upstream of said constant volume regulating means in the path of flow from said inlet openings to said first and second constant volume regulating means, said deflector means having an extension overlapping said inlet openings to receive substantially all of the flow from said inlet openings and operative to direct at least a portion of the flow through each inlet opening into the flow through the other inlet opening to achieve a thorough mixing of said flows and a substantially uniform pressure on the inlet side of said first and second constant volume regulators.

7. Apparatus of the type described comprising, in combination, means defining an enclosure, means defining first and second inlets opening adjacent each other into the interior of said enclosure, means defining an outlet from said enclosure interior and arranged in relative spaced relationship from said inlets, means supported within said enclosure intermediate said inlets and outlet and including first and second constant volume regulating means defining restricted openings between said inlets and outlet and operative to maintain a constant volume flow from said inlets to said outlet, a plurality of blade means, and means supporting said blade means upstream of said first and second constant volume regulating means in the path of flow from said inlets to said first and second constant volume regulating means, said blade means having an extension overlapping said inlets to receive substantially all of the flow from said inlets with the blade means associated with said first inlet being at an angle with respect to the flow through said inlets to direct flow through said first inlet into flow through said second inlet to achieve a thorough mixing of said flows and a substantially uniform pressure on the inlet side of said first and second constant volume regulating means.

8. Apparatus of the type described having a relatively high capacity comprising, in combination, means defining an enclosure, first and second duct means defining first and second inlet openings to the interior of said enclosure, means defining an outlet opening from said enclosure arranged in spaced relationship from said inlet openings, constant volume regulating means arranged between and operative to maintain a constant volume flow of air from said inlet openings to said outlet opening, first and second valve means disposed one in each of said first and second duct means at said first and second inlet openings, and means supporting each of said first and second valve means in a balanced condition on an axis generally located centrally of each of said valve in said first and second duct means in the path of air flow through said inlet openings and further supporting said valve means in relatively different positions and for simultaneous pivotal movement about said axes with respect to their respective inlet openings with one of said valve means moving toward a generally open position as the other of said valve means moves toward a substantially closed position.

9. Apparatus of the type described having a relatively high capacity comprising, in combination,
  means defining an enclosure,
  means defining an outlet in said enclosure,
  first and second adjacent hollow duct means opening into said enclosure and in spaced relation from said outlet opening,
  first and second valve means disposed one in each of said duct means,
  means supporting said first and second valve means one in each of the paths of flow through said duct means in a balanced condition and at a different angle with respect to their respective air flow paths and with one of said valve means arranged to assume a first position parallel to the direction of flow through its respective duct means when the other valve means assumes a second position extending generally transversely of the direction of flow through and substantially closes its respective duct means,
  means for simultaneously moving said first and second valve means so that as one valve means is moved toward said first position the other valve means is moved toward said second position,
  and sealing means disposed between said first and second valve means and said duct means and maintaining continuous engagement between adjacent portions of said duct means and said first and second valve means during movement of said first and second valve means between their first and second positions, said sealing means comprising generally U-shaped members having the webs thereof attached to respective ones of said first and second valve means and the legs thereof diverging generally angularly from said valve means and engaging a respective one of said duct means.

10. Apparatus of the type described comprising, in combination,
  means defining an enclosure,
  means defining first and second adjacent inlet openings to the interior of said enclosure,
  means defining an outlet spaced from said inlet openings and opening to the interior of said enclosure,
  constant volume regulating means supported within said enclosure between said inlet and outlet openings and operative to maintain a constant volume flow of air from said inlet openings to said outlet opening,
  said inlet openings arranged to direct flow therefrom in a generally common parallel direction toward said constant volume regulating means,
  first and second valve means,
  means supporting each of said valve means at one of said inlet openings in a balanced condition and for movement relative to said inlet opening to move one of said valve means toward a generally open position as the other of said valve means is moved toward a substantially closed position,
  means for simultaneously moving said first and second valve means,
  and deflector means in said enclosure upstream of said constant volume regulating means in the path of flow from said inlet openings to said first and second constant volume regulating means, said deflector means having an extension overlapping said inlet openings to receive substantially all of the flow from said inlets and operative to direct at least a portion of the flow through each inlet opening into the flow through the other inlet opening to achieve a thorough mixing of said flows and a substantially uniform pressure on the inlet side of said first and second constant volume regulators.

11. A balanced valve arrangement for relatively high capacity apparatus of the type described and comprising, in combination,
  first and second generally rectangular passages,
  first and second generally rectangular valve bodies,
  means supporting said valve bodies for pivotal movement in said passages about a generally centrally located axis with a first pair of opposite valve sides moving parallel to a first pair of opposed passage walls and a second pair of opposite valve sides moving transversely of and into and out of engagement with a second pair of opposed passage walls,
  means for simultaneously moving said valve bodies one toward an open position and the other toward a substantially closed position,
  and sealing means extending between said first pair of valve sides and said first pair of passage walls and maintaining continuous sealing engagement between said valve body and said passage during movement of said valve body in said passage,
  said sealing means comprising a pair of generally U-shaped sealing members having the webs thereof attached to a respective one of said first pair of valve body sides and the legs thereof diverging angularly from said valve body sides and engaging a respective one of said first pair of opposed passage walls.

12. Apparatus of the type described comprising, in combination,
  means defining an enclosure,
  first and second hollow duct members including generally parallel arranged adjacent duct member portions in said enclosure interior and defining first and second inlet openings to the interior of said enclosure,
  means defining an outlet opening from said enclosure interior and arranged in relative spaced relationship from said inlet openings,
  means supported within said enclosure intermediate said inlet and outlet openings and including first and second constant volume regulating means defining restricted openings between said inlet and outlet openings and operative to maintain a constant volume flow of air from said inlet openings to said outlet openings,
  a plurality of air directing blade means,
  said adjacent duct member portions terminating on the inlet side of said constant volume regulating means,
  and said blade means connected at the discharge end of said duct member portions so that they are upstream of said first and second constant volume regulating means and in the path of flow from each of said inlet openings into said enclosure, the blade means associated with said first and second duct member portions angled with respect to each other to direct air flow from each duct member portion into the other to achieve a mixing of said air flows prior to passage through said constant volume regulating means.

13. The apparatus of claim 12 wherein said duct member portions each include means defining a notch in portions thereof which are generally in confronting relationship.

14. The apparatus of claim 12 wherein said duct members are generally rectangular in transverse cross section, and including first and second valve means arranged in the path of flow through each of said duct members and means engaging and supporting said first and second valve means for pivotal movement about an axis located generally centrally of each of said valve members so that said valve members assume a balanced condition with respect to flow through said duct members.

15. The apparatus of claim 14 wherein said first and second valves are arranged at an angle to each other and including means for simultaneously pivoting said first and second valve members in the same directions so that as one valve member moves to a substantially closed position in its duct member the other moves to a generally open position in its duct member.

16. Apparatus of the type described having a relatively high capacity comprising, in combination, means defining an enclosure, means defining an outlet in said enclosure, first and second adjacent hollow duct means opening into said enclosure and in spaced relation from said outlet opening, said duct means being generally rectangular in transverse cross-section, first and second generally rectangular valve means disposed one in each of said duct means, means supporting said first and second valve means one in each of the paths of flow through said duct means in a balanced condition for movement about a generally centrally located axis, said first and second valve means being disposed at different angles with respect to their respective air flow path with one of said valve means arranged to assume a first position parallel to the direction of flow through its respective duct means when the other valve means assumes a second position extending generally transverse to the direction of flow through and substantially closing its respective duct means and further supported with one pair of opposite sides of each valve means moving parallel to one pair of opposed duct walls and the other pair of opposite valve means sides moving toward and away from the other pair of opposed duct walls, and mean for simultaneously moving said first and second valve means so that as one valve means is moved toward its first position the other valve means is moved toward its second position.

17. The apparatus of claim 16 including generally U-shaped sealing means arranged with the web thereof attached to respective ones of said pair of opposite valve means sides and the legs thereof diverging angularly from said valve means toward and engaging respective ones of the duct walls of said one pair of opposed duct walls, and also including sealing means arranged to extend between the other pair of opposite valve means sides and the other pair of opposed duct walls when said valve means are closed in said duct means.

18. The apparatus of claim 16 wherein the length of said first and second valve means extending transversely of said axis and the distance between said other pair of opposed duct walls is such that said valve means are disposed substantially at a 45° angle to the path of air flow through said duct members when said valve means are in their second position so that the movement of said valve means is limited to substantially 45°.

References Cited

UNITED STATES PATENTS

| | | | |
|---|---|---|---|
| 2,703,586 | 3/1955 | Asker | 251—306 X |
| 2,934,312 | 4/1960 | Stevens | 251—306 X |
| 2,957,629 | 10/1960 | Curran | 98—36 X |
| 2,970,803 | 2/1961 | Harza | 251—307 X |
| 2,976,884 | 3/1961 | Kurth et al. | 137—606 |
| 3,026,041 | 3/1962 | Jentoft | 98—38 X |
| 3,127,182 | 3/1964 | Wardleigh | 251—306 X |
| 3,145,926 | 8/1964 | O'Day | 98—38 X |
| 3,180,245 | 4/1965 | Erickson et al. | 98—38 |
| 3,250,203 | 5/1966 | Spradling et al. | 98—38 |

FOREIGN PATENTS

| | | |
|---|---|---|
| 1,295,203 | 7/1961 | France. |

ROBERT A. O'LEARY, *Primary Examiner.*

MEYER PERLIN, *Examiner.*

W. E. WAYNER, *Assistant Examiner.*